(12) United States Patent
Baeuerle et al.

(10) Patent No.: US 9,507,810 B2
(45) Date of Patent: Nov. 29, 2016

(54) UPDATING DATABASE SCHEMAS IN A ZERO-DOWNTIME ENVIRONMENT

(71) Applicants: Stefan Baeuerle, Walldorf (DE); Wolfgang Lehner, Walldorf (DE); Anil Kumar Goel, Waterloo (CA); Frank Renkes, Walldorf (DE); Joydeep Das, Dublin, CA (US)

(72) Inventors: Stefan Baeuerle, Walldorf (DE); Wolfgang Lehner, Walldorf (DE); Anil Kumar Goel, Waterloo (CA); Frank Renkes, Walldorf (DE); Joydeep Das, Dublin, CA (US)

(73) Assignee: SAP SE, Walldorf (DE)

( * ) Notice: Subject to any disclaimer, the term of this patent is extended or adjusted under 35 U.S.C. 154(b) by 405 days.

(21) Appl. No.: 14/102,280

(22) Filed: Dec. 10, 2013

(65) Prior Publication Data
US 2015/0161182 A1 Jun. 11, 2015

(51) Int. Cl.
*G06F 17/30* (2006.01)
*H04L 29/08* (2006.01)

(52) U.S. Cl.
CPC ....... *G06F 17/30297* (2013.01); *H04L 67/141* (2013.01)

(58) Field of Classification Search
CPC ............ G06Q 10/10; G06F 17/30286; G06F 17/30595; G06F 17/30297
USPC ........................................................ 707/803
See application file for complete search history.

(56) References Cited

U.S. PATENT DOCUMENTS

| | | | |
|---|---|---|---|
| 8,346,747 B2 | 1/2013 | Liu et al. | |
| 8,356,010 B2 | 1/2013 | Driesen | |
| 8,412,739 B2 | 4/2013 | Engelko et al. | |
| 2005/0050076 A1* | 3/2005 | Tong | G06F 17/30297 |
| 2007/0174317 A1* | 7/2007 | Bangel | G06F 17/30604 |
| 2009/0037769 A1* | 2/2009 | Babkin | G06F 17/30516 714/15 |
| 2010/0088281 A1* | 4/2010 | Driesen | G06F 8/65 707/641 |
| 2010/0138440 A1 | 6/2010 | Driesen | |
| 2010/0138821 A1 | 6/2010 | Driesen et al. | |
| 2011/0307524 A1* | 12/2011 | Aitken | G06F 17/30306 707/803 |
| 2012/0036165 A1 | 2/2012 | Driesen et al. | |
| 2012/0041988 A1 | 2/2012 | Driesen | |
| 2012/0089625 A1 | 4/2012 | Bentzien et al. | |
| 2012/0239616 A1 | 9/2012 | Cunningham et al. | |
| 2012/0259809 A1 | 10/2012 | Hermann et al. | |
| 2013/0159247 A1 | 6/2013 | Engelko et al. | |
| 2013/0219043 A1 | 8/2013 | Steiner et al. | |
| 2013/0226973 A1 | 8/2013 | Hopmann et al. | |
| 2013/0290282 A1 | 10/2013 | Faerber et al. | |

OTHER PUBLICATIONS

Jianxin Xue, Derong, Shen, Tiezheng Nie, Yue Kou, and Ge Yu, "A Transparent Approach for Database Schema Evolution Using View Mechanism," Web-Age Information Management, vol. 7418, Aug. 18, 2012, pp. 405-418.
Extended European Search Report, from a corresponding foreign application, EP 14003671.6, mailed Apr. 15, 2015.

* cited by examiner

*Primary Examiner* — Hosain Alam
*Assistant Examiner* — Robert F May
(74) *Attorney, Agent, or Firm* — Fountainhead Law Group P.C.

(57) ABSTRACT

A system is described for processing schema updated in a zero-downtime environment. A technique includes establishing an application session to access a database, receiving a schema update, converting the database to an updated database according to the schema update after establishing the application session, generating a temporary compensation view from the schema update, the temporary compensation view containing compensation logic to locate database objects belonging to the database, receiving a database transaction from the application session to access a database object in the database; and processing the compensation logic to locate the database object.

12 Claims, 7 Drawing Sheets

UPDATING DATABASE SCHEMAS IN A ZERO-DOWNTIME ENVIRONMENT

BACKGROUND

A database is an organized collection of data. Each database is generated from a database schema that provides a blueprint for how the data structures in the database are constructed. The database schema also includes rules and constraints that are enforced when changes are made to the database such as inserting, modifying, or deleting data. A database system enforces these rules and constraints to ensure the integrity of the database. Over time, a database schema is updated as the database evolves. This can include adding, modifying, or deleting data structures from the database. These updates can add or change the functionality of the database.

Traditionally, a database system that is updating the database schema to a newer version requires a period of downtime. In a traditional business environment, the administrator can inform customers that the database system will be down for maintenance for a period of time. During this downtime, active application sessions with the database system are aborted and new application sessions with the database system are delayed until the update is complete. The abortion and delay of application sessions on the database system is an undesirable side effect of the update process. This is particularly true in a cloud environment where customers from different time zones run application sessions on the database system at all times of the day.

SUMMARY

In one embodiment, a computer-implemented method establishes, by a processor, an application session to access a database (DB). The method then receives, by the processor, a schema update. The method then converts, by the processor, the database to an updated database according to the schema update after establishing the application session. The method then generates, by the processor, a temporary compensation view from the schema update, the temporary compensation view containing compensation logic to locate database objects belonging to the database. The method then receives, by the processor, a database transaction from the application session to access a database object in the database. The method finally processes, by the processor, the compensation logic to locate the database object.

In another embodiment, a non-transitory computer readable storage medium stores one or more programs comprising instructions for establishing an application session to access a database, receiving a schema update, converting the database to an updated database according to the schema update after establishing the application session, generating a temporary compensation view from the schema update, the temporary compensation view containing compensation logic to locate database objects belonging to the database, receiving a database transaction from the application session to access a database object in the database, and processing the compensation logic to locate the database object.

In another embodiment, a computer implemented system comprises one or more computer processors and a non-transitory computer-readable storage medium. The non-transitory computer-readable storage medium comprises instructions, that when executed, control the one or more computer processors to be configured for establishing an application session to access a database, receiving a schema update, converting the database to an updated database according to the schema update after establishing the application session, generating a temporary compensation view from the schema update, the temporary compensation view containing compensation logic to locate database objects belonging to the database, receiving a database transaction from the application session to access a database object in the database, and processing the compensation logic to locate the database object.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Various embodiments described herein enable application sessions with a database management system (DBMS) to remain active while a database's underlying schema is being updated. Updating the schema can result in changes to the structure of objects in the database, thereby updating the database. For example, a column in a table can be moved to another table, a column in a table can be deleted, or a table can be deleted entirely. This in turn can change the structure of object instances in a database. Problems may arise when an existing application session accesses the updated database because object instances have moved or have been deleted.

To address this problem, the DBMS creates a temporary compensation view (TCV) that contains compensation logic. The compensation logic provides backwards compatibility to the updated database. As a result, the DBMS can process database transactions from existing application sessions by using the TCV to locate where a desired object instance is located, either in the updated database or in an auxiliary database. When all application sessions that existed before the update are terminated, the TCV and any temporary databases associated with the TCV can be deleted to avoid polluting the database and the DBMS.

Figure 1:
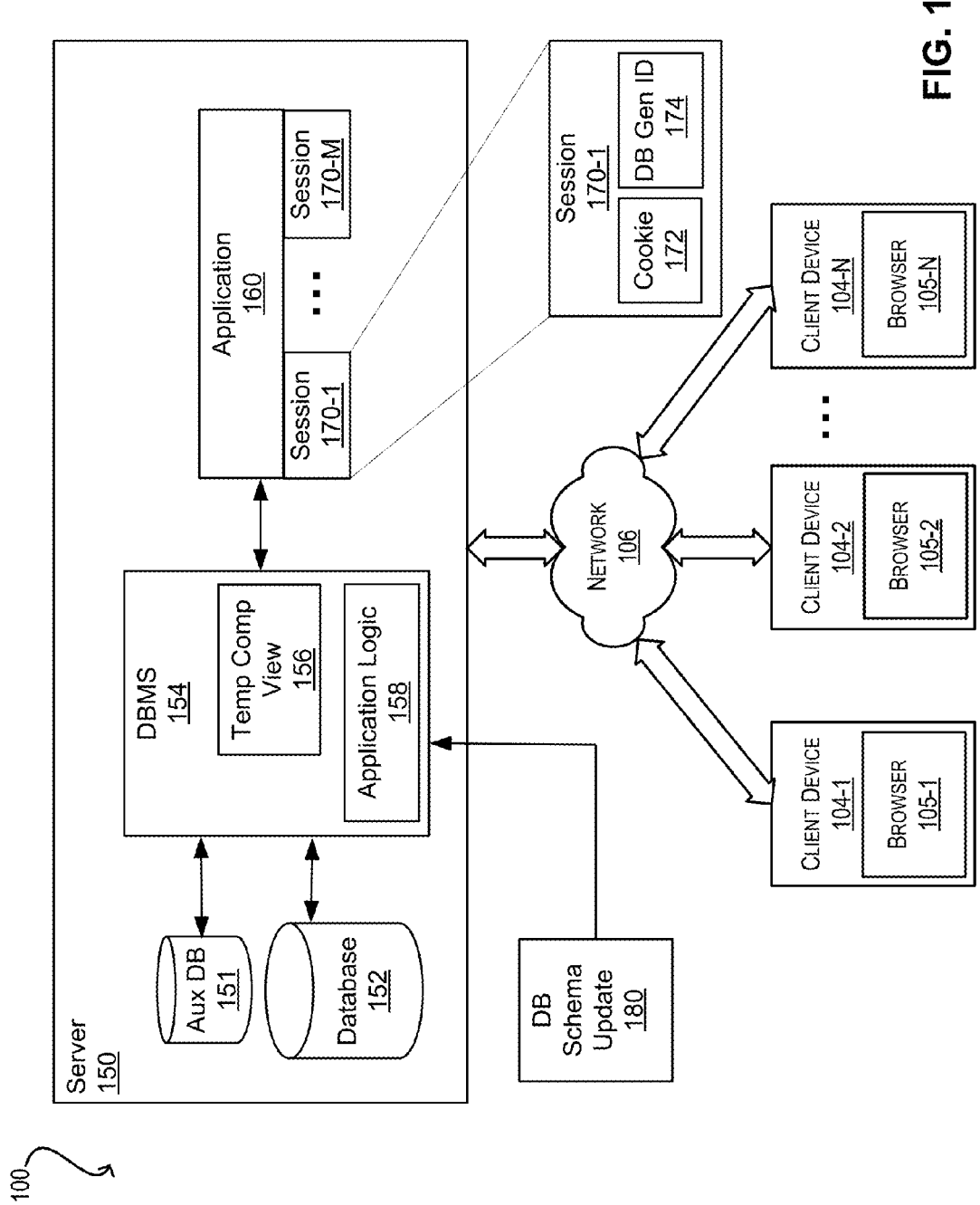
FIG. 1 illustrates a system according to one embodiment.

FIG. 1 illustrates system 100 according to one embodiment. System 100 includes server 150, network 106 and client devices 104-1 through 104-N. Through network 106, each client device can access application 160 on server 150. Application 160 is a cloud-based or OnPremise application configured to provide services that include managing or analyzing data in database 152. For each client device that accesses application 160, application 160 can establish an application session with DBMS 154 to retrieve, modify, or otherwise access database 152. Here, some of client devices 104-1 through 104-M can access application 160 using web browsers 105-1 through 105-N, respectively. Application sessions 170-1 through 170-M are in turn established. An application session can include a session cookie that is used to identify the session and a DB generation ID to identify the generation of the database that is associated with the application session. As shown here, session 170-1 includes session cookie 172 and DB generation ID 174.

Each application session of application sessions 170-1 through 170-M can submit database transactions to DBMS 154, which in turn performs operations on database 152 that correspond to the database transactions. At some point in time, DBMS 154 can terminate an active application session. For example, DBMS 154 can terminate the application session when a database transaction is received to save the database or if the application session times out. In some examples, a single client device can establish multiple application sessions. In other examples, an application on the client device other than a web browser can establish an application session with DBMS 154.

System 100 further includes DB schema update 180. DB schema update 180 is an update to the schema of DBMS 154. An administrator of DBMS 154 can deploy DB schema update 180 to add new functionality to application logic 158 of DBMS 154 or to modify the structure of database 152. DBMS 154 processes DB schema update 180 which can result in updates to application logic 156 and database 152. When database 152 is updated, DBMS 154 can assign database 152 a new DB generation ID. For example, the DB generation ID of database 152 can be incremented.

In some embodiments, DBMS 154 can generate TCV 156 when one or more of application sessions 170-1 through 170-M were active before the schema update. Application sessions that were active before the schema update are known as outdated application sessions since they began on an older schema. When DBMS 154 performs a DB transactions submitted from an outdated application session, the result can be different than if the DB transaction was received before the schema update. To maintain consistency in database performance, TCV 156 can serve as a bridge or patch for application sessions operating off of the old schema (i.e., outdated application sessions), thereby allowing these outdated application sessions to operate off of the new schema. In some examples, DBMS 154 can generate auxiliary database 152 to store data that has been deleted from database 152 during the update. This deleted data is accessible by TCV 156 so that outdated application sessions can still access data deleted by the schema update. DBMS 154 can run database transactions from outdated application sessions through TCV 156. When all the outdated application sessions have been terminated, TCV 156 and auxiliary database 151 can be removed and/or deleted. This can prevent TCV 156 and auxiliary database 151 from polluting DBMS 154 and database 152.

Figure 2:
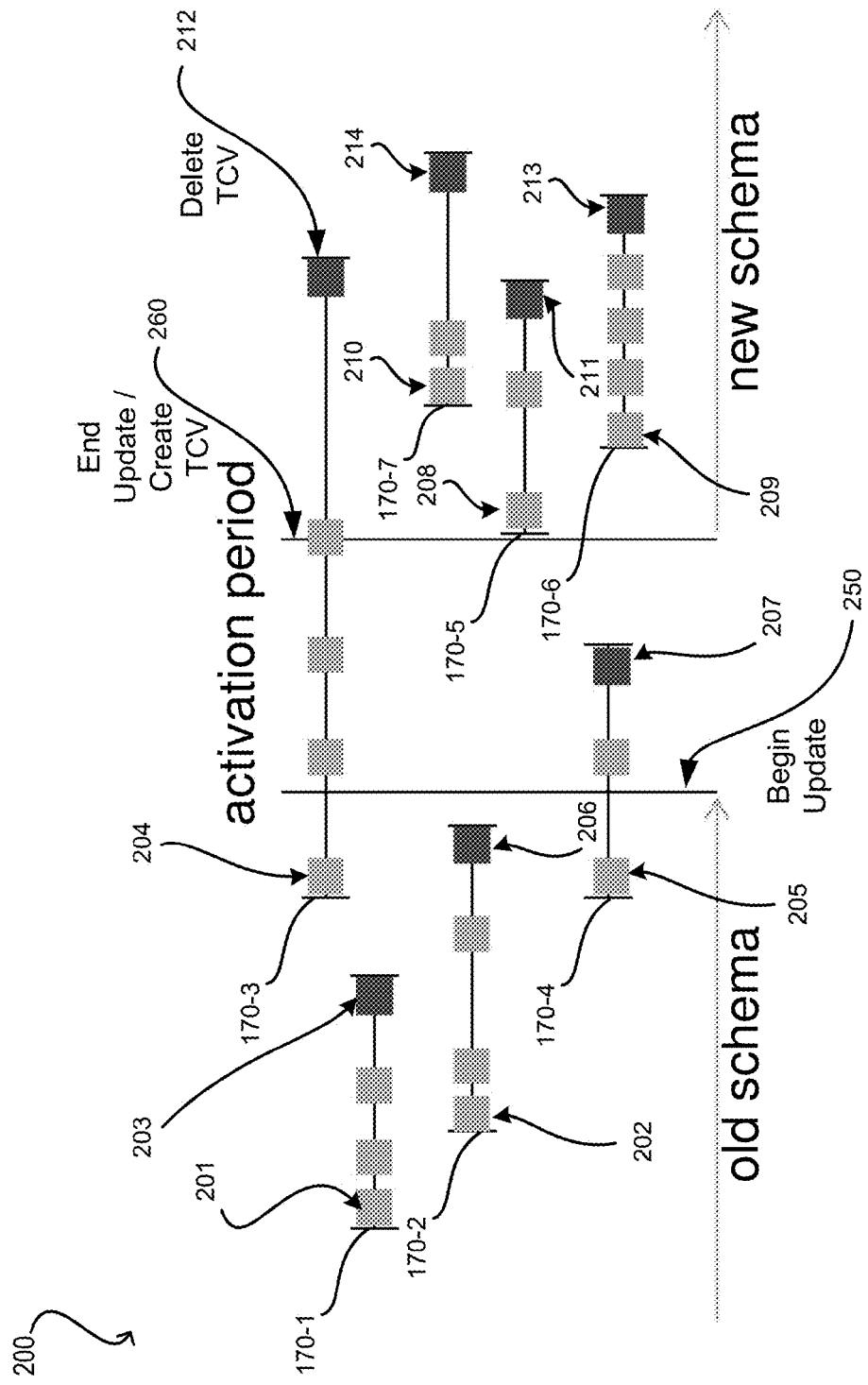
FIG. 2 illustrates a timeline showing application sessions with a database management system during a schema update according to one embodiment.

FIG. 2 illustrates timeline 200 showing application sessions with a DBMS during a schema update according to one embodiment. As shown, timeline 200 includes application sessions 170-1 through 170-7 and an activation period for a schema update that begins at 250 and ends at 260. Before 250, DBMS 154 is operating off of the old schema. The old schema is used to generate a first version of database 152. At 250, DBMS 154 begins the update process and enters the activation period. During the activation period, changes are being made to the database schema and the database according to the schema update. However, these changes are not committed until 260. In some examples, DBMS can also generate a TCV from the schema update. At 260 (the end of the activation period), the schema update happens as an atomic step and a second version of database 152 replaces the first version. DBMS 154 also creates TCV at 260 to handle application sessions that still depend on the first version of database 152 (e.g., application session 170-3). By using the TCV, DBMS 154 can offer application sessions both the old schema and the new schema. In some examples, DBMS 154 can process a database transaction from an application session operating off of an old schema at the same time as another database transaction from another application session operating off of the new schema. Thus, DBMS 154 offers an environment where schema upgrades and updates can be performed with zero downtime.

DBMS 154 first establishes application session 170-1 at 201. Application session 170-1 is established while DBMS 154 is operating off of the old schema. As a result, all database transactions of application session 170-1 reference the first version of database 152. DBMS 154 then establishes application session 170-2 at 202. DBMS 154 is still operating off of the old schema and therefore all database transactions of application session 170-2 also reference the first version of database 152. Note that application session 170-1 and 170-2 can simultaneously submit DB transactions to DBMS 154.

DBMS 154 then terminates application session 170-1 at 203. At this point, DBMS 154 only supports application session 170-2. At 204 and 205, DBMS 154 establishes application sessions 170-3 and 170-4, respectively. Application sessions 170-3 and 170-4 are established while DBMS is operating off of the old schema and therefore database transaction of application sessions 170-3 and 170-4 reference the first version of database 152. At this point, there are three application sessions (170-2, 170-3, and 170-4) that are active on DBMS 154. All three can submit DB transactions to DBMS 154. At 206, DBMS 154 terminates application session 170-2, leaving two active application sessions (170-3 and 170-4).

At 250, DBMS 154 begins updating the schema. In one embodiment, DBMS can detect that there are two application sessions (170-3 and 170-4) that are active when the schema update begins. The existence of active application sessions at the beginning of the schema update can trigger DBMS 154 to create TCV 156. However since the schema update is not committed until the end of the activation period (260), DBMS 154 can process database transactions that occur during the activation period by simply referencing the first version of database 154 which is still available. As such, TCV 156 is not needed for database transactions during the activation period. At 207, application session 170-4 is terminated thus leaving only application session 170-3 active.

At 260, the activation period has concluded and the schema of DBMS 154 has been updated. A result of the schema update is a second version of database 152 that replaces the first version. In one embodiment, DBMS 154 can detect the existence of an active application session (170-3) at 260. The active application session still references the first version of database 152 even though the first version has been replaced by the second version. The existence of one or more active application sessions at the end of the activation period can trigger DBMS to create TCV 156 to handle these outdated application sessions that reference the first version of database 152. In one example, TCV 156 can serve as a bridge or patch to allow DBMS 154 to reference the first version of database 152 from the second version of database 152. For instance, a column in a first table in the first version of database 152 is moved to a second table in the second version of database 152. TCV 156 can include compensation logic that maps the column from the first version of database 152 to the second version of database 152. When a database transaction to access the column in the first version of database 152 is received, DBMS 154 can use mapping information in TCV 156 to locate the column in the second version of database 152.

At 208, 209, and 210, DBMS 154 establishes application sessions 170-5, 170-6, and 170-7, respectively. All of these application sessions are established on the new schema and therefore reference the second version of database 152. Since the second version of database 152 is the current version, DBMS 154 can process database transactions from these application sessions directly without requiring TCV 156. In contrast, application session 170-3 references the first version of database 152 and therefore DBMS 154 can process database transactions submitted by application session 170-3 are processed first using TCV 156.

At 212, application session 170-3 is terminated. Upon termination an outdated application session, DBMS 154 can determine whether there are any additional outdated application sessions that rely on TCV 156. If there are no longer any outdated application sessions that rely on TCV 156, DBMS 154 can delete TCV 156. At 213 and 214, DBMS 154 terminates application sessions 170-6 and 170-7, respectively.

Figure 3:
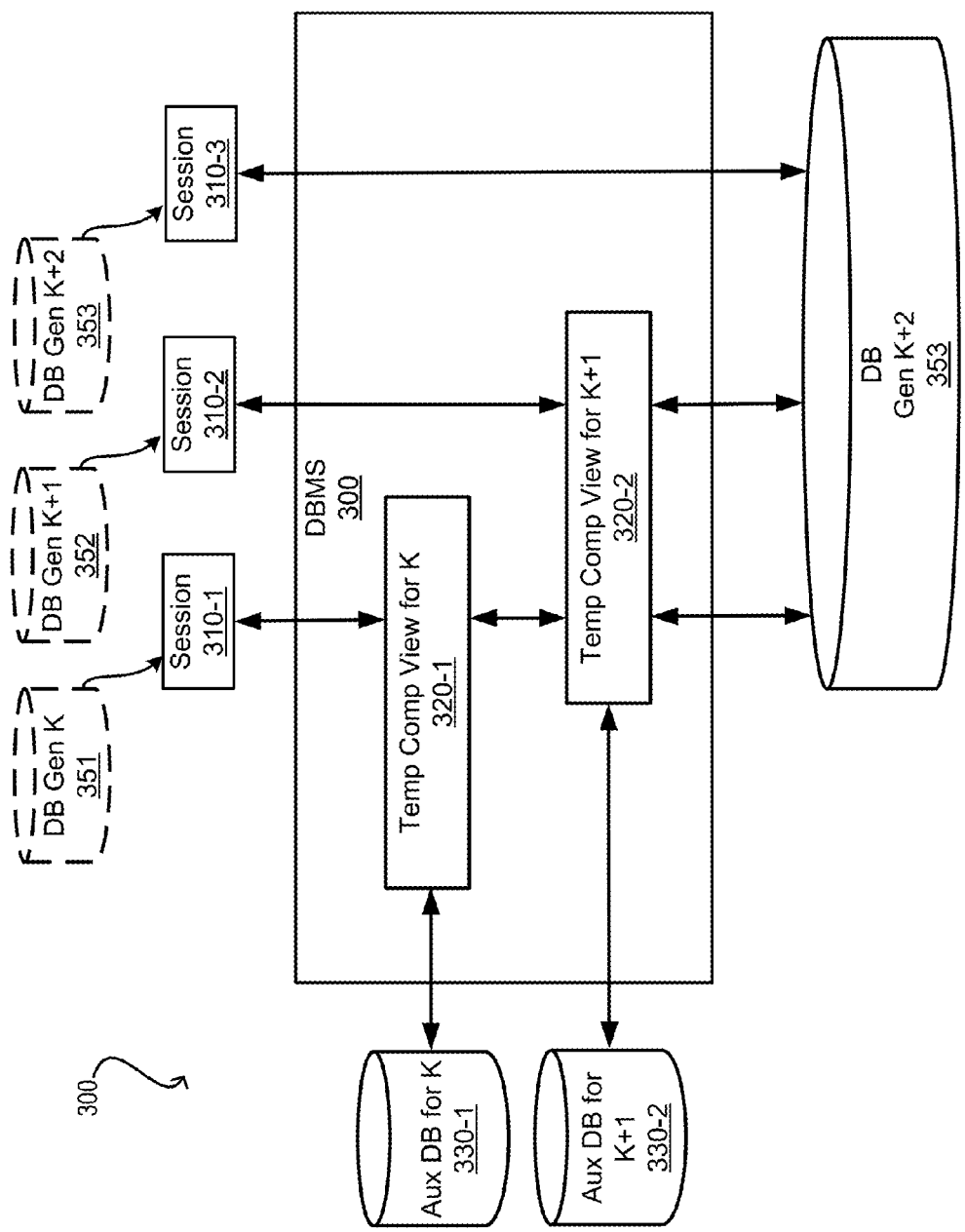
FIG. 3 illustrates a database management system stacking multiple temporary compensation views according to one embodiment.

FIG. 3 illustrates a DBMS stacking multiple temporary compensation views according to one embodiment. In some situations, an application session can remain active across multiple schema updates. As a result, the application session can appear outdated to the current schema. DBMS 300 may stack multiple TCVs when processing database transactions from the outdated application session in order to emulate or mimic older schemas. This allows outdated application sessions to still function on the current schema. When DBMS applies a TCV, an older version of the application logic and the database is made available to the outdated application session. In this embodiment, we focus on older generations of the database but it is to be understood by one of skill in the art that older versions of the application logic can also be made available through the processing of TCVs.

Here, application session 310-3 is established in the current schema (K+2) and thus references database 353 (which is database generation K+2). Since database 353 is the current database available, DBMS 300 can process database transactions from application session 310-3 to access database 353 without applying any TCVs. In contrast, application session 310-2 was established in an old schema (K+1) and thus references database 352 (which is database generation K+1). Database 352 is dated and has been replaced with database 353. In order to process database transactions from application session 310-2 that wish to access database 352, DBMS 300 can emulate database 352 through TCV 320-2. In one example, DBMS 300 can wrap TCV 320-2 around database 353 to emulate database 352. TCV 320-2 can be generated by DBMS 300 when the database was updated to database 353 to provide backwards compatibility to application sessions that still reference the older database (such as application session 310-2).

DBMS 300 is also communicating with application session 310-1. Application session 310-1 was established in an older schema (K) and references database 351 (which is database generation K). As shown, database generation K is two generations away from the current generation, which is database generation K+2. In order to process database transactions from application session 320-1 that wish to access database 351, DBMS can emulate database 351 by combining one or more of TCV 320-1, TCV 320-2, auxiliary DB 330-1, and auxiliary DB 330-2. The TCVs can be stacked, thus allowing long running application sessions to survive multiple schema changes. In some examples, DBMS can process a database transaction from application session 310-1 by executing compensation logic in TCV 320-2 followed by compensation logic in TCV 320-1.

In some embodiments, TCV 320-1 and 320-2 can use the same name as the underlying database object. This allows TCVs to be plug and play when it comes to the DBMS. For example, let's assume there is a database table with the name "myTable." An application session submits the database transaction "SELECT * FROM myTable." If the schema is updated during the database transaction to delete the table "myTable," a TCV can be created having an auxiliary database to maintain the persistency of "myTable" which has been deleted from the database. The database table can be stored in the auxiliary table with the name "myTable" to maintain consistency, thus allowing DBMS to easily process database transactions without having to modify the database transactions. The TCV can be implemented as a SQL-block.

Types of Schema Changes

A variety of schema changes can occur during a schema update. Depending on the schema change, compensation logic may accompany that change. Below are a list of exemplary schema changes and the compensation logic that potentially can accompany the schema change.

Create Table

In one embodiment, a schema update can create a new database object in a database operating off of the updated schema. For example, a new table can be added to an updated generation of a database. Since application sessions based on the outdated schema are unaware of the new table, these outdated application sessions will not read or write to the new table. As a result, no compensation logic accompanies the creation of a new table.

Delete Table

In one embodiment, a schema update can delete a database object. As a result, an updated database is missing the database object. This can cause a problem when an application session that is referencing an older generation of the database is unable to access the deleted database object in the updated database. For example, a table can be deleted in a schema, thus resulting in a table being deleted in an updated generation of a database. If active application sessions still reference an older generation of the database (which contains the deleted table), DBMS can create a TCV to compensate for the deleted table. To compensate for the deleted table, the schema update can include the syntax "with compensation" as part of the delete object statement.

Figure 4:
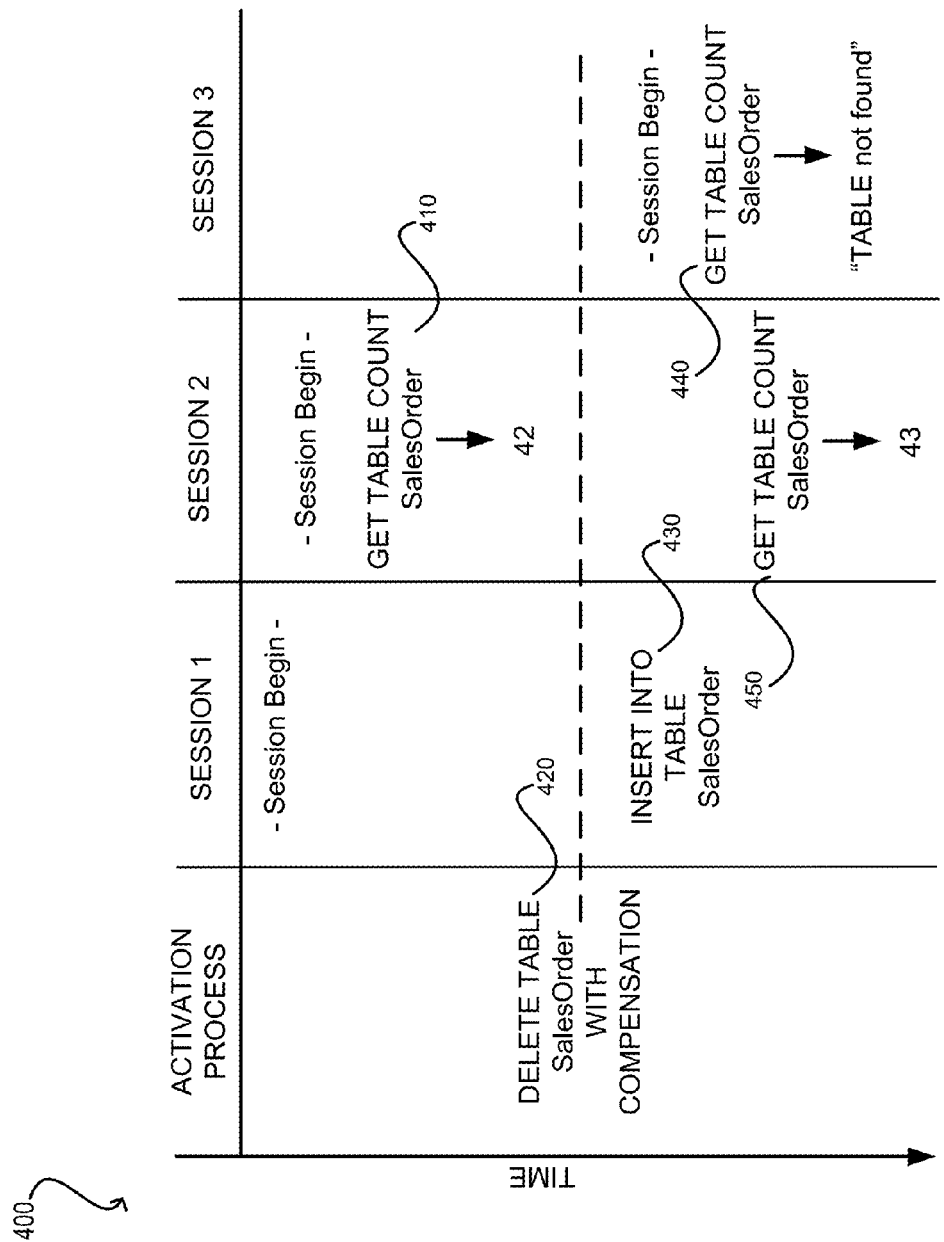
FIG. 4 illustrates a flow chart that shows a schema update deleting a table according to one embodiment.

FIG. 4 illustrates flow chart 400 that shows a schema update deleting a table according to one embodiment. As shown application sessions 1 and 2 are established before a schema update deletes table SalesOrder. Therefore, application sessions 1 and 2 operate off of a schema that includes the table SalesOrder. At 410, session 2 submits a database transaction to get a count on the number of entries in the table SalesOrder. The DBMS perform the transaction and returns a count of 42. At 420, a schema update containing the operation "DELETE TABLE SalesOrder WITH COMPENSATION" is committed. At this point, DBMS deletes the table "SalesOrder" from the database. Since the operation includes the syntax "WITH COMPENSATION," DBMS can generate a TCV to maintain the persistency of the table SalesOrder after the schema update. DBMS can process the syntax "WITH COMPENSATION" as a user desiring to preserve the persistency of the database after the schema change. In one example DBMS can create an auxiliary database to save table SalesOrder and can generate a TCV that points to the table SalesOrder in the auxiliary database after table SalesOrder has been deleted from the main database. This allows the table SalesOrder to still be accessible to sessions 1 and 2 which are operating off of the old schema.

At 430, session 1 submits a database transaction containing an operation to insert into table SalesOrder. The DBMS can process the database transaction by using the TCV to access table SalesOrder in the auxiliary database. Data is then inserted into table SalesOrder. In this environment, session 1 is unaware that table SalesOrder is no longer in the main database and is instead stored in the auxiliary database. In the viewpoint of session 1, the database is behaving as if the schema has not changed. This is desirable since session 1 does not need to modify its behavior to account for changes due to the schema update.

At 440, session 3 is established after schema update has deleted table SalesOrder and therefore is operating on a version of the schema which does not include table SalesOrder. When session 3 submits a database transaction with an operation to get a count on the number of entries in the table SalesOrder, DBMS processes the database transaction and returns a result that the table cannot be found. DBMS does not use the TCV to access table SalesOrder in the auxiliary database since session 3 was established on the new schema. In some examples, DBMS can check the database generation ID of a session to determine whether a TCV and which TCV(s) should be used when processing database transactions from a given session.

At 450, session 2 submits a database transaction containing an operation to get a count on the number of entries in table SalesOrder. DBMS processes the database transaction by using the TCV to access table SalesOrder in the auxiliary database since session 2 references the old schema (which can be determined by evaluating the database generation ID of session 2). DBMS can retrieve the count from table SalesOrder and returns a count of 43. As shown, sessions 1 and 2 can both still access the table SalesOrder which was deleted at 420. In some examples, DBMS can delete the TCV and the auxiliary database after sessions 1 and 2 are terminated.

Alter Table by Adding New Column

In one embodiment, a schema update can alter an existing database object. For example, a schema update can add an additional column to a table. In some examples, the instructions for adding in the additional column can be accompanied with a request to compensate for the additional column. Compensation logic associated with the additional column can include default values to apply to the column when a database transaction from a session referencing the older schema adds an entry into the table where the entry does not include a value for the additional column. In other examples, the schema update can also be accompanied by read compensation logic (logic to compensate for when an operation reads from the updated table). For example, read compensation can instruct the DBMS to remove the additional column when returning the table to a session operating off of the old schema. Below is an example of code to add in an additional column with write compensation.

```
ALTER TABLE SalesOrder
  ADD COLUMN LASTCHANGEDATE DATE
  WITH
    AFFECTED ROW AS SALESORDER_ROW
    WRITE COMPENSATION FOR COLUMN LASTCHANGEDATE
    BEGIN
      // MIGHT RETURN A CONSTRAINT VALUE
      VALUES ('2013-10-29')
      // OR CALL A STORED PROCEDURE
      CALL FOO_COMPENSATE (SALESORDER_ROW)
    END;
```

As shown above, a column "LASTCHANGEDATE" has been added to the table "SalesOrder." Also shown is that the column is being added with "WRITE COMPENSATION," which means that the DBMS is to compensate for this change when a write operation is being performed on the table SalesOrder. In one embodiment, the compensation logic can include writing a default value provided by the schema update. Here, a default value of "2013-10-29" is provided as the default value when a write operation does not include a value for the column "LASTCHANGEDATE." In another embodiment, the compensation logic can include calling a stored procedure. Here, a stored procedure titled "FOO_COMPENSATE" can also be called when a session referencing an older schema writes to the updated table.

Alter Table by Altering a Column

In one embodiment, a schema update can alter the values in a column of a database object. For example, a column of a database table that was storing data of type string can be altered so that the column stores data of type integer. In other words, the data type of the column has changed. In one example, the DBMS can create a TCV containing compensation logic that backward casts (e.g., cast a value of the new data type to a value of the old data type for consumption by the outdated session) values in the column during a read operation. In another example, the DBMS can create a TCV containing compensation logic that forward casts (e.g., caste a value of the old data type to a value of the new data type for storage in the updated schema) values in the column during a write operation. Depending on the instructions in the schema update, the compensation logic in the TCV can vary. Below is an example of code to alter the data type of a column with read and write compensation.

```
CREATE TABLE USER (
  ID      INTEGER PRIMARY KEY,
  NAME VARCHAR (200))
ALTER TABLE SalesOrder
  MODIFY COLUMN CREATED BY SET DATATYPE INTEGER
  WITH
AFFECTED ROW AS SALESORDER_ROW
WRITE COMPENSATION FOR COLUMN CREATEDBY
    BEGIN
      SELECT U.ID AS CREATEDBY
      FROM USER U
      WHERE U.NAME = SALESORDER_ROW.CREATEDBY
    END
READ COMPENSATION
    BEGIN
      SELECT U.NAME AS CREATEDBY
      FROM USER U
      WHERE SALESORDER_ROW.CREATEDBY = U.ID
    END
```

Alter Table by Dropping a Column

In one embodiment, a schema update can drop a column of a database object. For example, a column in a table can be deleted. In these situations, DBMS can handle the deletion a variety of ways. In one example, DBMS can delay the deletion of the physical deletion of the column until all sessions that reference the old schema have been terminated. At that point in time, the column can be deleted from the table. DBMS can generate an event that is triggered when all sessions that reference the old schema have been terminated to determine when the column should be deleted. In another example, DBMS can create an auxiliary database to store a copy of the table that contained the dropped column and generate a TCV that points to the copy of the table. The TCV can be applied for sessions that reference the old schema. When all sessions that reference the old schema have terminated, DBMS can delete the auxiliary database and the TCV, thus minimizing clutter in the code stream.

Modify Table by Adding a Constraint

In some embodiment, a schema update can modify a table by adding a constraint. A constraint can restrict the values that can be written into the table. For example, a constraint can specify that values written into a column cannot be NULL. Given that the old schema does not have these restrictions, a DBMS can create a TCV with write compensations to allow sessions that are operating off of the old schema to write into the database without being restricted by these constraints.

In one embodiment, a schema update can include a constraint that a column in a table can no longer be set to NULL. The schema update can optionally include a write compensation that specifies a default value to write into the column when a session operating off of the old schema attempts to write a NULL value into the column. Alternatively, the default value can come from the table definition instead of the schema update. As a third option, the write compensation can instruct the DBMS to raise a runtime error and abort the database transaction.

In another embodiment, a schema update can include a constraint that the values added into a column of a table must be unique. This can be useful if the column is containing identifiers that are to uniquely identify each entry in the table. This constraint is related to writing into the table and thus does not affect read operations on the table. However, a session operating on the old schema may trigger the constraint when the session attempts to write a value into the column that is not unique. In one example, the schema update can include a write compensation to generate a replacement value and restart the write operation when an outdated session writes into the column. The DBMS can create a TCV with compensation logic to detect for non-uniqueness, generate a replacement value, and restart the write operation.

In another embodiment, a schema update can include a foreign key constraint. A foreign key constraint is used to ensure data consistency between tables. For example, let's assume there is a table titled Orders where the Orders table includes a column OrderID. Let's assume there is also another table titled Materials where the Materials table includes a column titled MaterialsID. Orders table includes another column that titled MaterialsOrdered column that identifies the material that is being added to the order. A foreign key constraint can be added during a schema update that restricts values that can go into the MaterialsOrdered column to only values in MaterialsID column. When such a constraint is added during a schema update, application sessions operating off of the old schema may violate this constraint because they are unaware of such a constraint on the tables. In one example, the compensation logic can generate a new value for the column. In another example, the compensation logic can insert an entry (tuple) into the table and retry the constraint. In yet another example, the compensation logic can raise a runtime error and abort the transaction.

In another embodiment, a schema update can include a trigger. The trigger can update existing triggers or be a new trigger. When an update to an existing trigger is received, the DBMS can migrate the old trigger to a TCV for execution by sessions operating off of the old schema. For new triggers, the DBMS can set the new triggers as being visible for the sessions operating off of the old schema so that old sessions and new sessions both support the new trigger.

Figure 5:
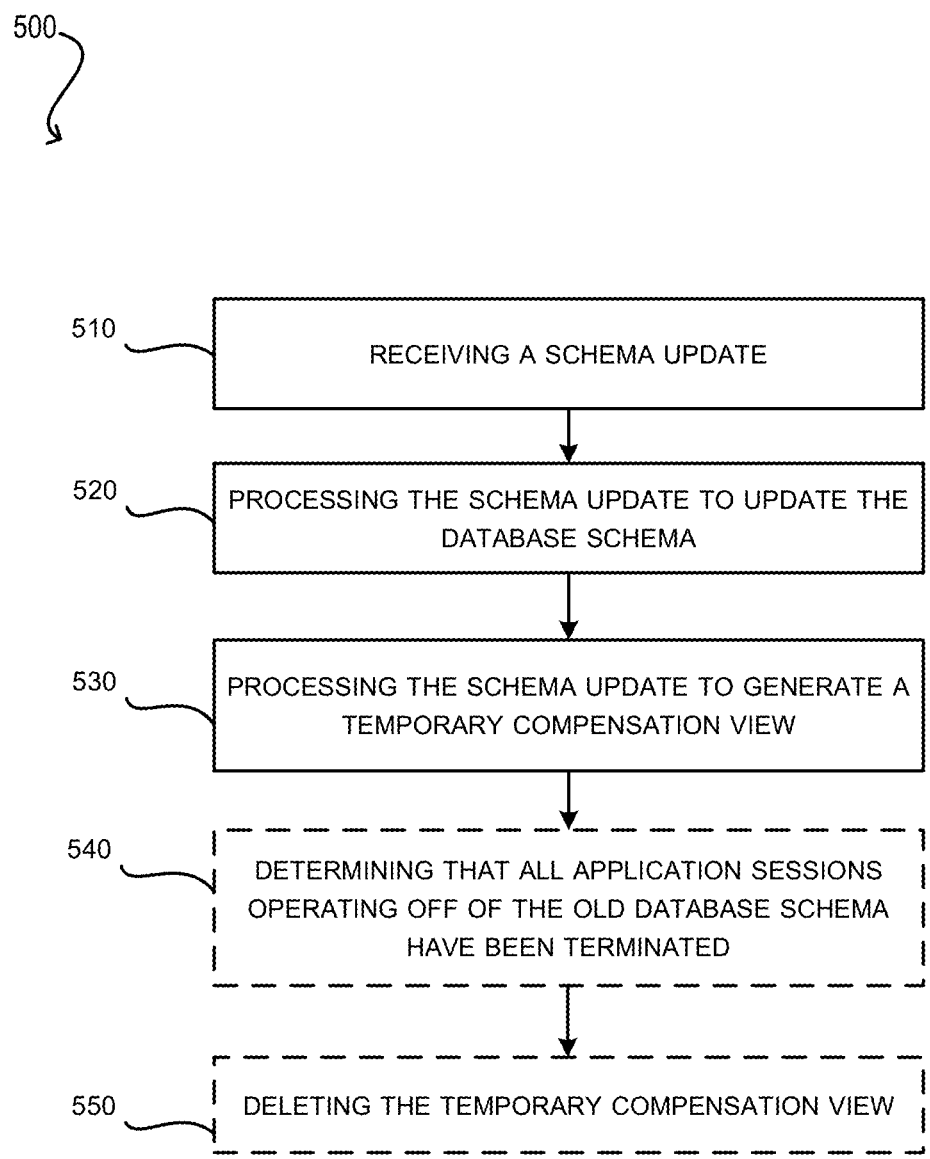
FIG. 5 illustrates a process flow for processing a schema update according to one embodiment.

FIG. 5 illustrates a process flow for processing a schema update according to one embodiment. Process 500 can be stored in computer readable medium and executed by a processor such as the processor of DBMS 154. Process 500 begins by receiving a schema update at 510. The schema update can include one or more changes to the database schema. Process 500 then continues by processing the schema update to update the database schema at 520. Processing the schema update replaces an old database schema with a new database schema. In some examples, the new database schema can replace the old database schema in one atomic step. Process 500 further processes the schema update to generate a TCV at 530. The TCV can include compensation logic which can mimic the old database schema. This allows application sessions that were established during the old database schema to operate on the new database schema. This can conclude the schema update process.

In some examples, process 500 can also delete the TCV at a later point in time when it is no longer needed. At 540, process 500 can determine that all application sessions operating off of the old database schema have been terminated. Once all application sessions that may utilize the TCV have been terminated, process 500 can delete the TCV at 550.

Figure 6:
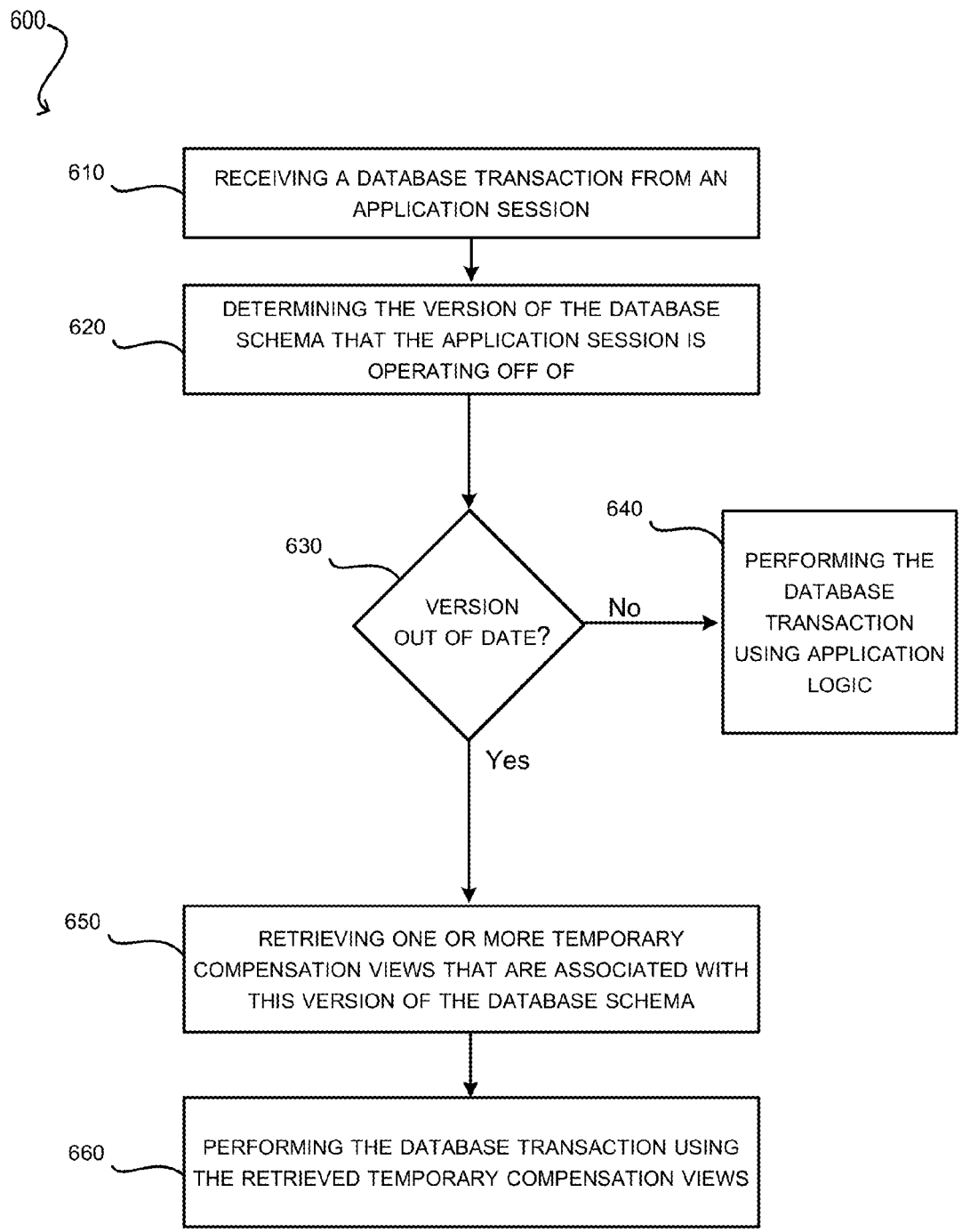
FIG. 6 illustrates a process flow for processing a database transaction according to one embodiment.

FIG. 6 illustrates a process flow for processing a database transaction according to one embodiment. Process 600 can be stored in computer readable medium and executed by a processor such as the processor of DBMS 154. Process 600 begins by receiving a database transaction from an application session at 610. The database transaction can be to perform an operation on a database. After receiving the database transition, process 600 can determine the version of the database schema that the application session is operating off of at 630. This can include evaluating the database transaction to determine the version or to receive the version from the application session. If the version is not out of date at 630, then process 600 continues by performing the database transaction using application logic at 640. The application logic can be in the DBMS. If alternatively the version is out of date at 630, process 600 continues by retrieving one or more TCVs that are associated with this version of the database schema at 650. In one example, the DBMS can perform a lookup to determine the TCVs that are associated with this version of the database schema and retrieve the TCVs from a TCV database. Process 600 then continues by performing the database transaction using the retrieved TCVs at 660. By using the TCVs, the DBMS can perform the database transaction using the old schema. This can include the old database and the application logic in the old schema.

Figure 7:
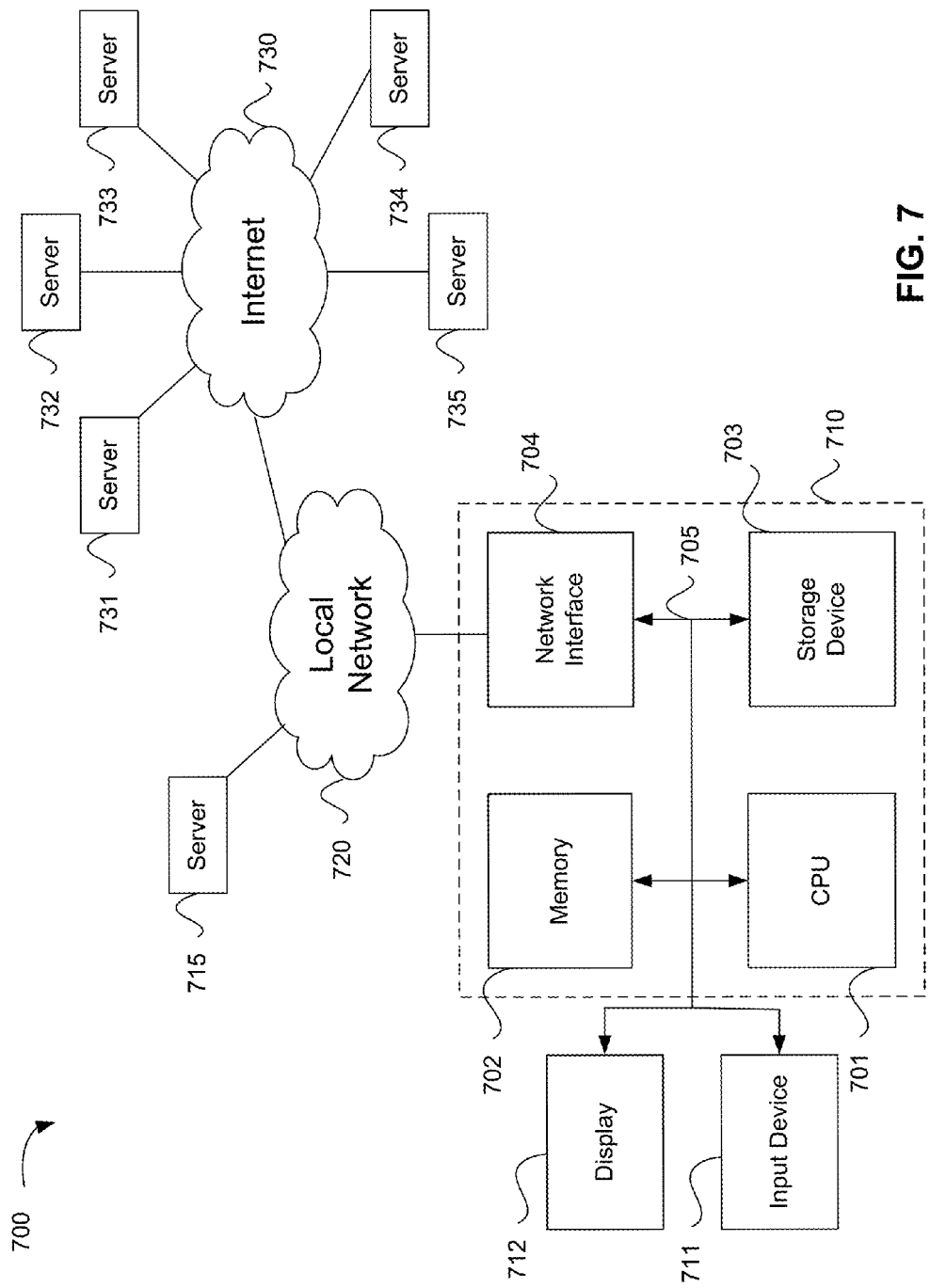
FIG. 7 illustrates an exemplary computer system according to one embodiment.

An exemplary computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (OM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    Establishing, by a processor, a first application session to access a database;
    Receiving, by the processor, a first schema update;
    Converting, by the processor, the database to a first updated database according to a first schema update after establishing the first application session, wherein converting the database to an updated database includes generating, by the processor, a first auxiliary database to store database objects that are missing in the updated database;
    Generating, by the processor, a first temporary compensation view from the first schema update, the first temporary compensation view containing first compensation logic to locate database objects belonging to the database;
    Establishing, by the processor, a second application session to access the database;
    Receiving, by the processor, a second schema update;
    Converting, by the processor, the database to a second updated database according to the second schema update after establishing the second application session;
    Generating, by the processor, a second temporary compensation view from the second schema update, the second temporary compensation view containing second compensation logic to locate database objects belonging to the first auxiliary database;
    Receiving, by the processor, a database transaction form the second application session to access a database object in the database; and
    Processing, by the processor, the first compensation logic and the second compensation logic to locate the database object.

2. The computer-implemented method of claim 1, further comprising:
    Terminating, by the processor, the first application session; and
    Deleting, by the processor, the first temporary compensation view when the first application session is terminated.

3. The computer-implemented method of claim 1, wherein the database object is stored in the first auxiliary database and the second compensation logic locates the database object in the first auxiliary database.

4. The computer-implemented method of claim 1, wherein the first compensation logic references a session cookie and a session identifier.

5. A non-transitory computer readable storage medium storing one or more programs, the one or more programs comprising instructions for:
    Establishing a first application session to access a database;
    Receiving a first schema update;
    Converting the database to a first updated database according to a first schema update after establishing the first application session, wherein converting the database to an updated database includes generating, by the processor, a first auxiliary database to store database objects that are missing in the updated database;
    Generating a first temporary compensation view from the first schema update, the first temporary compensation view containing first compensation logic to locate database objects belonging to the database;
Establishing a second application session to access the database;
Receiving a second schema update;
Converting the database to a second updated database according to the second schema update after establishing the second application session;
Generating a second temporary compensation view from the second schema update, the second temporary compensation view containing second compensation logic to locate database objects belonging to the first auxiliary database;
Receiving a database transaction form the second application session to access a database object in the database; and
Processing the first compensation logic and the second compensation logic to locate the database object.

6. The non-transitory computer readable storage medium of claim 5, further comprising:
Terminating the first application session; and
Deleting the first temporary compensation view when the first application session is terminated.

7. The non-transitory computer readable storage medium of claim 5, wherein the database object is stored in the first auxiliary database and the first compensation logic locates the database object in the first auxiliary database.

8. The non-transitory computer readable storage medium of claim 5, wherein the first compensation logic references a session cookie and a session identifier.

9. A computer implemented system, comprising:
One or more computer processors; and
A non-transitory computer-readable storage medium comprising instructions;
that when executed, control the one or more computer processors to be configured for:
Establishing a first application session to access a database;
Receiving a first schema update;
Converting the database to a first updated database according to a first schema update after establishing the first application session, wherein converting the database to an updated database includes generating, by the processor, a first auxiliary database to store database objects that are missing in the updated database;
Generating a first temporary compensation view from the first schema update, the first temporary compensation view containing first compensation logic to locate database objects belonging to the database;
Establishing a second application session to access the database;
Receiving a second schema update;
Converting the database to a second updated database according to the second schema update after establishing the second application session;
Generating a second temporary compensation view from the second schema update, the second temporary compensation view containing second compensation logic to locate database objects belonging to the first auxiliary database;
Receiving a database transaction form the second application session to access a database object in the database; and
Processing the first compensation logic and the second compensation logic to locate the database object.

10. The computer implemented system of claim 9, further comprising:
Terminating the first application session; and
Deleting the first temporary compensation view when the first application session is terminated.

11. The computer implemented system of claim 9, wherein the database object is stored in the first auxiliary database and the first compensation logic locates the database object in the first auxiliary database.

12. The computer implemented system of claim 9, wherein the first compensation logic references a session cookie and a session identifier.

* * * * *